(12) United States Patent
Iwagoe et al.

(10) Patent No.: US 9,811,013 B2
(45) Date of Patent: *Nov. 7, 2017

(54) TONER BINDER AND TONER

(71) Applicant: SANYO CHEMICAL INDUSTRIES, LTD., Kyoto-shi, Kyoto (JP)

(72) Inventors: Yuya Iwagoe, Kyoto (JP); Masaru Honda, Kyoto (JP)

(73) Assignee: SANYO CHEMICAL INDUSTRIES, LTD., Kyoto-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/661,841

(22) Filed: Mar. 18, 2015

(65) Prior Publication Data

US 2015/0192871 A1 Jul. 9, 2015

Related U.S. Application Data

(62) Division of application No. 13/878,071, filed as application No. PCT/JP2011/005611 on Oct. 5, 2011, now abandoned.

(30) Foreign Application Priority Data

Oct. 6, 2010 (JP) ................................ 2010-226976
Mar. 30, 2011 (JP) ................................ 2011-076650

(51) Int. Cl.
| | |
|---|---|
| *G03G 9/087* | (2006.01) |
| *G03G 9/08* | (2006.01) |
| *C08G 63/16* | (2006.01) |
| *C08L 67/02* | (2006.01) |

(52) U.S. Cl.
CPC ......... *G03G 9/08755* (2013.01); *C08G 63/16* (2013.01); *C08L 67/02* (2013.01); *G03G 9/0819* (2013.01); *G03G 9/0827* (2013.01); *G03G 9/08795* (2013.01); *G03G 9/08797* (2013.01)

(58) Field of Classification Search
None
See application file for complete search history.

(56) References Cited

U.S. PATENT DOCUMENTS

| | | |
|---|---|---|
| 2005/0227157 A1 | 10/2005 | Shirai |
| 2007/0281235 A1 | 12/2007 | Ono et al. |
| 2009/0269691 A1 | 10/2009 | Yamato et al. |

FOREIGN PATENT DOCUMENTS

| | | |
|---|---|---|
| JP | 8-328303 A | 12/1996 |
| JP | 10-268558 A | 10/1998 |
| JP | 2004-285131 A | 10/2004 |
| JP | 2006-154686 A | 6/2006 |
| JP | 2007-025448 A | 2/2007 |
| JP | 2007-238954 A | 9/2007 |
| JP | 2009-063987 A | 3/2009 |
| JP | 4506592 B2 | 7/2010 |

OTHER PUBLICATIONS

International Search Report for PCT/JP2011/005611, dated Nov. 15, 2011 (2 pages).

*Primary Examiner* — Kuo-Liang Peng
(74) *Attorney, Agent, or Firm* — Westerman, Hattori, Daniels & Adrian, LLP

(57) ABSTRACT

Provided is a toner binder having excellent charging characteristics and blocking resistance, and an increased range of fixing temperatures when used as a toner. The present invention is a toner binder containing a polyester resin (P) comprising one or more types of polyester resins obtained by polycondensation of a carboxylic acid component (x) and an alcohol component (y), wherein at least one type (P1) of (P) contains 50 to 95 mol % of a aliphatic diol (y1) having a carbon number of 2 to 4 in the alcohol component (y), and (P) satisfies expressions (1) and (2).

$11.5 \leq \text{SP value } [(cal/cm^3)^{1/2}] \text{ of } (P) \leq 13.0$ (1)

$5.2 \leq \text{HLB value (by Oda method) of } (P) \leq 7.1$ (2).

2 Claims, No Drawings

TONER BINDER AND TONER

CROSS-REFERENCE TO RELATED APPLICATIONS

This application is a divisional of U.S. application Ser. No. 13/878,071, filed on Apr. 5, 2013, now abandoned, which is a 371 of International Application No. PCT/JP2011/005611, filed on Oct. 5, 2011, which claims the benefit of priority from the prior Japanese Patent Application No. 2010-226976, filed on Oct. 6, 2010 and Japanese Patent Application No. 2011-076650, filed on Mar. 30, 2011, the entire contents of which are incorporated herein by reference.

TECHNICAL FIELD

The present invention relates to a toner binder and a toner used for electrophotography, electrostatic recording, electrostatic printing, and the like.

BACKGROUND ART

It is required of an electrophotographic toner binder for a heat fixing method adopted generally as a fixing method of an image in a copier, a printer, and the like that a toner does not fuse with a heat roll even at a high fixing temperature (hot offset resistance); that a toner can be fixed even at a low fixing temperature (low temperature fixing properties); that storage stability as fine particles is good (blocking resistance); and the like.

In order to improve such fixing performance of a toner, there is conventionally known a method in which incompatible resins specialized in a low temperature range and a high temperature range respectively are used as a matrix phase and a domain phase. In addition, there is proposed a method in which a compatibilizing agent for compatibilizing the incompatible resins is contained in a vinyl resin such as a styrene polymer (Patent Document 1, etc.).

In order to improve blocking resistance, especially blocking resistance in relation to storage stability under a high temperature and high humidity environment, there is proposed a toner binder composed of a polyester resin obtained by using a specific polyol component such as 1,2-propylene glycol and neopentyl glycol, without consideration for the SP value range and the HLB value range (Patent Document 2, etc.).

PRIOR ART DOCUMENTS

Patent Documents

Patent Document 1: JP-A-8-328303
Patent Document 2: JP-A-2006-154686

SUMMARY OF THE INVENTION

Problems to be Solved by the Invention

However, in recent years, colorization, high speed, high reliability, downsizing, low cost, and energy saving of a copier/printer have been increasingly demanded. In particular, from the viewpoint of request for a reduction in environmental burdens (energy saving), there has been demanded a resin which achieves both improved low temperature fixing properties and blocking resistance of a toner and which has further excellent charging characteristics. An action for this demand is urgently needed.

Moreover, the conventional toner composed of a matrix phase and a domain phase does not satisfy all of fixing properties (a balance between low temperature fixing properties and hot offset resistance) and storage stability sufficiently. When a recent high speed machine or small electronic copier is used, a particularly broad range of fixing temperatures is required.

An object of the present invention is to provide a toner binder having an increased range of fixing temperatures and excellent blocking resistance and charging characteristics when used as a toner; and a toner.

Solutions to the Problems

The present inventors have made intensive studies in order to solve these problems, and consequently achieved the present invention.

That is, the present invention includes the below-described two inventions.

(1) A toner binder containing a polyester resin (P) comprising one or more types of polyester resins obtained by polycondensation of a carboxylic acid component (x) and an alcohol component (y), wherein at least one type (P1) of (P) contains 50 to 95 mol % of an aliphatic diol (y1) having a carbon number of 2 to 4 in the alcohol component (y), and (P) satisfies expressions (1) and (2).

$$11.5 \leq \text{SP value } [(\text{cal/cm}^3)^{1/2}] \text{ of } (P) \leq 13.0 \quad (1)$$

$$5.2 \leq \text{HLB value [by Oda method] of } (P) \leq 7.1 \quad (2)$$

(2) A toner containing the above-described toner binder, a colorant, and if necessary one or more types of additives selected from a release agent, a charge control agent, and a fluidizing agent.

Effects of the Invention

The use of the toner binder of the present invention makes it possible to provide a toner having an increased range of fixing temperatures and excellent blocking resistance and charging characteristics (saturated charge amount, charge rising properties, and charge stability).

MODE FOR CARRYING OUT THE INVENTION

Hereinbelow, the present invention will be described in detail.

A toner binder of the present invention contains a polyester resin (P) comprising one or more types of polyester resins obtained by polycondensation of a carboxylic acid component (x) and an alcohol component (y).

The polyester resin (P) may be one type of polyester resin, but preferably comprises a linear polyester resin (A) and a non-linear polyester resin (B). (A) and (B) may be each two or more types in combination.

As to the polyester resin (P), it is necessary that at least one type (P1) of (P) contains 50 to 95 mol % of an aliphatic diol (y1) having a carbon number of 2 to 4 in the alcohol component (y), from the viewpoint of fixing properties. Thus, when the polyester resin (P) comprises a linear polyester resin (A) and a non-linear polyester resin (B), it is necessary that (A) and/or (B) contain(s) (P1), and it is preferable that at least (B) is (P1) and more preferable that (A) and (B) are both (P1).

Hereinbelow, a linear polyester resin (A) corresponding to (P1) that contains 50 to 95 mol % of an aliphatic diol (y1)

having a carbon number of 2 to 4 in the alcohol component (y) may be described as a linear polyester resin (A•P1), and a non-linear polyester resin (B) corresponding to (P1) that contains 50 to 95 mol % of an aliphatic diol (y1) having a carbon number of 2 to 4 in the alcohol component (y) may be described as a non-linear polyester resin (B•P1).

In the linear polyester resin (A), examples of the alcohol component (y) include a diol, a trivalent to octavalent or higher valent polyol, and a monool.

Examples of the diol include aliphatic diols (y1) having a carbon number of 2 to 4 (ethylene glycol, 1,2-propylene glycol, 1,3-propylene glycol, 1,4-butanediol, diethylene glycol, etc.), aliphatic diols having a carbon number of 5 to 36 (neopentyl glycol, 2,3-dimethylbutane-1,4-diol, 1,6-hexanediol, 1,8-octanediol, etc.); alkylene ether glycols having a carbon number of 5 to 36 (triethylene glycol, dipropylene glycol, tripropylene glycol, polyethylene glycol, polypropylene glycol, polytetramethylene ether glycol, etc.); alicyclic diols having a carbon number of 6 to 36 (1,4-cyclohexane dimethanol, hydrogenated bisphenol A, etc.); (poly)oxyalkylene (the carbon number of the alkylene group is 2 to 4, the same applies to a polyoxyalkylene group hereinbelow) ethers [the number of oxyalkylene units (hereinbelow, abbreviated as an AO unit) is 1 to 30] of the above-described alicyclic diols; polyoxyalkylene ethers (the number of AO units is 2 to 30) of divalent phenols [monocyclic divalent phenols (e.g. hydroquinone) and bisphenols (bisphenol A, bisphenol F, bisphenol S etc.)], and the like. Two or more types thereof may be used in combination.

Examples of the trivalent to octavalent or higher valent polyol include trivalent to octavalent or higher valent aliphatic polyalcohols having a carbon number of 3 to 36 (alkanepolyols and intramolecular or intermolecular dehydrates thereof, e.g. glycerin, trimethylolethane, trimethylolpropane, pentaerythritol, sorbitol, sorbitan, polyglycerin, and dipentaerythritol; and saccharides and derivatives thereof, e.g. sucrose and methyl glucoside); (poly)oxyalkylene ethers (the number of AO units is 1 to 30) of the above-described aliphatic polyalcohols; polyoxyalkylene ethers (the number of AO units is 2 to 30) of trisphenols (trisphenol PA, etc.); polyoxyalkylene ethers (the number of AO units is 2 to 30) of novolac resins (phenol novolac, cresol novolac, etc., the average polymerization degree is 3 to 60); and the like. Two or more types thereof may be used in combination.

Preferred among these trivalent to octavalent or higher valent polyols are polyoxyalkylene ethers (the number of AO units is 2 to 30) of novolac resins.

Examples of the monool include alkanols having a carbon number of 1 to 30 (methanol, ethanol, isopropanol, dodecyl alcohol, myristyl alcohol, cetyl alcohol, stearyl alcohol, etc.).

Preferred among these monools are alkanols having a carbon number of 8 to 24, and more preferred are dodecyl alcohol, myristyl alcohol, stearyl alcohol, and a combination thereof.

When the linear polyester resin (A) is the linear polyester resin (A•P1), examples of the alcohol component (y) include the aliphatic diol (y1) having a carbon number of 2 to 4, which is an essential constitutional component, as well as a diol (y2) of which the solubility parameter (hereinbelow, described as an SP value) is 11.5 to 16.0 [(cal/cm$^3$)$^{1/2}$, the same applies hereinbelow], a trivalent to octavalent or higher valent polyol, a monool, and the like.

The SP values in the present invention are those calculated according to the method described in the below-described document suggested by Fedors et al. "POLYMER ENGINEERING AND SCIENCE, FEBRUARY, 1974, Vol. 14, No. 2, ROBERT F. FEDORS. (pages 147 to 154)"

Examples of the aliphatic diol (y1) having a carbon number of 2 to 4 include the above-mentioned diols, and two or more types thereof may be used in combination.

Preferred among these (y1) are ethylene glycol and 1,2-propylene glycol, and more preferred is ethylene glycol.

Examples of the diol (y2) of which the SP value is 11.5 to 16.0 include, among the above-mentioned examples of diols, neopentyl glycol, 2,3-dimethylbutane-1,4-diol, cyclohexanedimethanol, polyoxyalkylene ethers of bisphenol A (the carbon number of the oxyalkylene group is 2 and/or 3, and the number of AO units is 2 to 30), polyoxyalkylene ethers of bisphenol F (the carbon number of the oxyalkylene group is 2 and/or 3, and the number of AO units is 2 to 30), polyoxyalkylene ethers of bisphenol S (the carbon number of the oxyalkylene group is 2 and/or 3, and the number of AO units is 2 to 30), hydrogenated bisphenol A, and the like. Two or more types thereof may be used in combination.

Preferred among these are neopentyl glycol and polyoxyalkylene ethers of bisphenol A, and more preferred is neopentyl glycol.

Examples of the trivalent to octavalent or higher valent polyol include the above-mentioned polyols, with the preferred ones being the same as well.

In the linear polyester resin (A•P1), the proportion of the aliphatic diol (y1) having a carbon number of 2 to 4 in the alcohol component (y) [in this section, the alcohol component (y) means an alcohol component to serve as a constitutional unit of the linear polyester resin (A•P1), exclusive of the component removed to the outside of the system during a polycondensation reaction] is generally 50 to 95 mol %, preferably 60 to 93 mol %, from the viewpoint of fixing properties.

The proportion of the diol (y2) of which the SP value is 11.5 to 16.0 in the alcohol component (y) is preferably 5 to 50 mol %, more preferably 7 to 40 mol %, from the viewpoint of storage stability.

In the case of the linear polyester resin (A•P1), it is preferable that the carboxylic acid component (x) and/or the alcohol component (y) contain(s) at least one of a monool and a monocarboxylic acid (x1) mentioned later, and more preferable that the carboxylic acid component (x) contains a monocarboxylic acid (x1), from the viewpoint of storage stability and productivity.

When a monool is contained, the monool is preferably used in such an amount (calculated value) that 5 mol % or more, more preferably 6 to 85 mol %, particularly preferably 8 to 80 mol %, most preferably 10 to 76 mol % of the terminal carboxyl groups of (A•P1) will be esterified with the monool, from the viewpoint of storage stability and productivity.

In the linear polyester resin (A), it is preferable that the carboxylic acid component (x) comprises a polycarboxylic acid (x2), and if necessary a monocarboxylic acid (x1). In the case of the linear polyester resin (A•P1), it is preferable that the carboxylic acid component (x) comprises a monocarboxylic acid (x1) and a polycarboxylic acid (x2).

As the monocarboxylic acid (x1), examples of aliphatic (including alicyclic) monocarboxylic acids include alkane monocarboxylic acids having a carbon number of 1 to 30 (formic acid, acetic acid, propionic acid, butanoic acid, isobutanoic acid, caprylic acid, capric acid, lauric acid, myristyl acid, palmitic acid, stearic acid, behenic acid, cerotic acid, montanoic acid, melissic acid, etc.), and alkene monocarboxylic acids having a carbon number of 3 to 24 (acrylic acid, methacrylic acid, oleic acid, linoleic acid, etc.).

As (x1), examples of aromatic monocarboxylic acids include aromatic monocarboxylic acids having a carbon number of 7 to 36 (benzoic acid, methylbenzoic acid, p-t-butylbenzoic acid, phenylpropionic acid, naphthoic acid, etc.).

Preferred among these (x1) are aromatic monocarboxylic acids having a carbon number of 7 to 36, and more preferred are benzoic acid, methylbenzoic acid, and p-t-butylbenzoic acid, and particularly preferred is benzoic acid.

In the linear polyester resin (A•P1), when a monocarboxylic acid (x1) is used, the monocarboxylic acid (x1) is preferably used in such an amount (calculated value) that 5 mol % or more, more preferably 6 to 85 mol %, particularly preferably 8 to 80 mol %, most preferably 10 to 76 mol % of the terminal hydroxyl groups of (A•P1) will be esterified with (x1), from the viewpoint of storage stability and productivity.

Moreover, in the linear polyester resin (A), the amount of the monocarboxylic acid (x1) is preferably 30 mol % or less, more preferably 1 to 25 mol %, particularly preferably 2 to 21 mol % based on the total amount of the carboxylic acid component (x), from the viewpoint of storage stability.

Examples of the polycarboxylic acid (x2) include a dicarboxylic acid (x21) and/or a trivalent to hexavalent or higher valent polycarboxylic acid (x22).

Examples of the dicarboxylic acid (x21) include alkanedicarboxylic acids having a carbon number of 4 to 36 (e.g. succinic acid, adipic acid, and sebacic acid); alicyclic dicarboxylic acids having a carbon number of 6 to 40 [e.g. dimer acids (dimerized linoleic acids)]; alkenedicarboxylic acids having a carbon number of 4 to 36 (e.g. alkenyl succinic acids such as dodecenyl succinic acid, maleic acid, fumaric acid, citraconic acid, and mesaconic acid); aromatic dicarboxylic acids having a carbon number of 8 to 36 (phthalic acid, isophthalic acid, terephthalic acid, naphthalenedicarboxylic acid, etc.); and ester-forming derivatives of these [lower alkyl (the carbon number of the alkyl group is 1 to 4: methyl, ethyl, n-propyl, etc.) esters, and acid anhydrides, the same applies to ester-forming derivatives hereinbelow], and two or more types thereof may be used in combination. Preferred among these are alkenedicarboxylic acids having a carbon number of 4 to 20, aromatic dicarboxylic acids having a carbon number of 8 to 20, and ester-forming derivatives of these. More preferred are terephthalic acid, isophthalic acid and/or lower alkyl (the carbon number of the alkyl group: 1 to 4) esters (x211) of these.

Examples of the trivalent to hexavalent or higher valent polycarboxylic acid (x22) include aromatic polycarboxylic acids having a carbon number of 9 to 20 (trimellitic acid, pyromellitic acid, etc.), aliphatic polycarboxylic acids having a carbon number of 6 to 36 (hexanetricarboxylic acid, etc.), and ester-forming derivatives of these. Two or more types thereof may be used in combination.

Preferred among these are trimellitic acid, pyromellitic acid, and ester-forming derivatives of these.

The content of terephthalic acid, isophthalic acid, and/or lower alkyl (the carbon number of the alkyl group: 1 to 4) esters (x211) of these in the polycarboxylic acid (x2) is preferably 85 to 100 mol %, more preferably 90 to 100 mol %, from the viewpoint of storage stability.

The mole ratio of terephthalic acid and/or lower alkyl esters thereof to isophthalic acid and/or lower alkyl esters thereof in (x211) is preferably 20:80 to 100:0, more preferably 25:75 to 80:20, from the viewpoint of mechanical strength of the resin.

In the linear polyester resin (A), the content of an aromatic carboxylic acid in the carboxylic acid component (x) is preferably 80 to 100 mol %, more preferably 85 to 100 mol %, from the viewpoint of storage stability and fixing properties.

The proportion of the total amount of the trivalent to octavalent or higher valent polyol and the trivalent to hexavalent or higher valent polycarboxylic acid (x22) in the total amount of the carboxylic acid component (x) and the alcohol component (y) is preferably 0.1 to 15 mol %, more preferably 0.2 to 12 mol %. When it is 0.1 mol % or more, storage stability of the toner is good, and when it is 15 mol % or less, charging characteristics of the toner is good.

A method of producing a linear polyester resin (A) by polycondensation of a carboxylic acid component (x) comprising a polycarboxylic acid (x2) and if necessary a monocarboxylic acid (x1), and an alcohol component (y) is not particularly limited. For example, a mixture of (x1) and (x2) and (y) may undergo polycondensation at one operation. Alternatively, at least a part of (x2) and (y) may undergo polycondensation in advance in such an equivalence ratio that the hydroxyl groups of (y) are excessively present, then the hydroxyl groups of the obtained polycondensate (AO) are allowed to react with the carboxyl groups of (x1) for further polycondensation. If necessary, after the polycondensation of (AO) and (x1), a trivalent to hexavalent or higher valent polycarboxylic acid (x22) may be charged thereinto for further polycondensation, provided that practically one or two functional groups of the polycarboxylic acid (x22) are allowed to react, with the rest of functional groups being left unreacted.

The reaction ratio of the alcohol component (y) to the carboxylic acid component (x) is, as an equivalence ratio of hydroxyl groups to carboxyl groups [OH]/[COON], preferably 2/1 to 1/2, more preferably 1.5/1 to 1/1.3, particularly preferably 1.3/1 to 1/1.2.

In the present invention, polycondensation of the carboxylic acid component (x) and the alcohol component (y) can be carried out by using a known esterification reaction. As a general method, for example, polycondensation can be carried out by allowing the esterification reaction to take place under an inert gas (nitrogen gas, etc.) atmosphere in the presence of a polymerization catalyst at a reaction temperature of preferably 150 to 280° C., more preferably 180 to 270° C., particularly preferably 200 to 260° C. The reaction time is preferably 30 minutes or more, particularly 2 to 40 hours, from the viewpoint of ensuring the polycondensation reaction.

Pressure reduction is also effective in order to improve the reaction rate at the last stage of the reaction.

Moreover, the polyester synthesized by the above-described method may be subjected to a dehydration reaction in the presence of a strong acid such as sulfuric acid at 160 to 180° C. to produce terminal vinyl groups. Particularly when the terminal vinyl groups are produced in the linear polyester resin (A•P1), they are preferably produced in such an amount (calculated value from the percentage of change in hydroxyl value: although two terminal hydroxyl groups may produce an ether bond as a by-product, the calculation is made provided that all are turned into vinyl groups) that 5 mol % or more, more preferably 6 to 85 mol %, particularly preferably 8 to 80 mol %, most preferably 10 to 76 mol % of the terminal hydroxyl groups of (A•P1) will be modified into vinyl groups, from the viewpoint of storage stability and productivity.

As the polymerization catalyst, a polymerization catalyst containing one or more types of metals selected from titanium, antimony, zirconium, nickel, and aluminum is preferably used, and a titanium-containing catalyst is more preferably used, from the viewpoint of reactivity and environmental protection.

Examples of the titanium-containing catalyst include titanium alkoxide, potassium oxalate titanate, titanium terephthalate, catalysts described in JP-A-2006-243715 [titanium dihydroxybis(triethanolaminate), titanium monohydroxytris(triethanolaminate), intramolecular polycondensates of these, etc.], catalysts described in JP-A-2007-11307 (titanium tributoxyterephthalate, titanium triisopropoxyterephthalate, titanium diisopropoxyditerephthalate, etc.), and the like.

Examples of the antimony-containing catalyst include antimony trioxide, and the like.

Examples of the zirconium-containing catalyst include zirconyl acetate, and the like.

Examples of the nickel-containing catalyst include nickel acetylacetonate, and the like.

Examples of the aluminum-containing catalyst include aluminum hydroxide, aluminum triisopropoxide, and the like.

It is desirable that the amount of catalyst to be added is appropriately decided such that the reaction rate reaches the maximum. The amount to be added is preferably 10 ppm to 1.9%, more preferably 100 ppm to 1.7%, based on the whole raw materials. When the amount to be added is 10 ppm or more, it is preferable in that the reaction rate is high.

Hereinabove and hereinbelow, % refers to % by weight unless otherwise noted.

The SP value of the linear polyester resin (A·P1) is preferably 11.3 to 13.0, more preferably 11.6 to 12.8.

When the SP value is 11.3 or more, fixing properties (at high temperature side) are better, and when it is 13.0 or less, blocking resistance is improved.

The SP value can be adjusted by the compositions and used amounts of raw materials: the carboxylic acid component (x) and the alcohol component (y).

The acid value (AV) (mgKOH/g, the same applies hereinbelow) of the linear polyester resin (A) is preferably 0 to 60, more preferably 1 to 55, particularly preferably 2 to 50. When the acid value is 60 or less, charging characteristics in the case where the resin (A) is used in the toner are not deteriorated.

The hydroxyl value (OHV) (mgKOH/g, the same applies hereinbelow) of the linear polyester resin (A) is preferably 0 to 125, more preferably 1 to 100. When the hydroxyl value is 125 or less, hot offset resistance and storage stability in the case where the resin (A) is used in the toner are better.

The acid value and the hydroxyl value in the present invention are measured according to the method specified in JIS K0070.

The peak top molecular weight (hereinbelow described as Mp) of a tetrahydrofuran soluble component of the linear polyester resin (A) is preferably 2000 to 12000, more preferably 2300 to 11500, particularly preferably 2500 to 11000. When Mp is 2000 or more, the resin strength required for fixation is attained, and when it is 12000 or less, low temperature fixing properties in the case where the resin (A) is used in the toner are good.

Hereinabove and hereinbelow, the peak top molecular weight (Mp) and the number average molecular weight (Mn) of the polyester resin are measured by using GPC under the conditions below.

Device (one example): HLC-8120 manufactured by TOSOH CORPORATION
Column (one example): TSKgel GMHXL (2 columns), TSKgel Multipore HXL-M (1 column)
Measurement temperature: 40° C.
Measurement solution: 0.25% tetrahydrofuran (THF) solution
Solution injection amount: 100 µl
Detection device: refractive index detector
Reference substance: TSK standard polystyrene (manufactured by TOSOH CORPORATION)
Molecular weight=Total 12 points: 4480000, 2890000, 1090000, 355000, 190000, 96400, 37900, 18100, 9100, 2800, 1050, 500

The molecular weight indicating the maximum peak height on the chromatogram obtained is referred to as a peak top molecular weight (Mp). In measurement of the molecular weight of the polyester resin, the polyester resin is dissolved in a THF solvent, and the insoluble component is filtered out using a glass filter, to prepare a sample solution.

The softening point [Tm] of the linear polyester resin (A) is preferably 70 to 120° C., more preferably 75 to 110° C., particularly preferably 80 to 105° C. Within this range, the balance between hot offset resistance and low temperature fixing properties is good.

It is to be noted that Tm is a value measured as follows.

Using an Koka type (elevated) flow tester {for example, CFT-500D manufactured by Shimadzu Corporation}, 1 g of a measurement sample is pushed out of a nozzle having a diameter of 1 mm and a length of 1 mm by application of a load of 1.96 MPa by means of a plunger while it is heated at a temperature elevation rate of 6° C./min, and a graph of the "plunger descending amount (flow value)" and the "temperature" is drawn. The temperature corresponding to ½ of the maximum value of the descending amount of the plunger is read from the graph, and the value (temperature at which half of the measurement sample has flowed out) is determined as the softening point [Tm].

The glass transition temperature [Tg] of the linear polyester resin (A) is preferably 45° C. or more, from the viewpoint of storage stability. When it is 75° C. or less, low temperature fixing properties in the case where the resin (A) is used in the toner are good.

Hereinabove and hereinbelow, it is to be noted that Tg is measured by using DSC20, SSC/580 manufactured by Seiko Instruments Inc. according to the method (DSC method) specified in ASTM D3418-82.

A tetrahydrofuran (THF) insoluble component of the linear polyester resin (A) is preferably 5% or less, more preferably 4% or less, particularly preferably 3% or less, from the viewpoint of low temperature fixing properties in the case where the resin (A) is used in the toner.

The THF insoluble component of the present invention is determined by the method below.

THF (50 ml) is added to 0.5 g of a sample, and stirred at reflux for 3 hours. After cooling, an insoluble component is filtered out by a glass filter, and the resin component remaining on the glass filter is dried under reduced pressure at 80° C. for 3 hours. The insoluble component is calculated from the weight ratio of the dried resin component on the glass filter to the sample.

In the toner binder of the present invention, the polyester resin (P) preferably contains a non-linear polyester resin (B) in addition to the linear polyester resin (A), from the viewpoint of achieving both low temperature fixing properties and offset resistance.

In the non-linear polyester resin (B), examples of the alcohol component (y) include the above-mentioned diols, trivalent to octavalent or higher valent polyols, and monools.

The non-linear polyester resin (B) is preferably a non-linear polyester resin (B•P1) that contains 50 to 95 mol % of an aliphatic diol (y1) having a carbon number of 2 to 4 in the alcohol component (y) [in this section, the alcohol component (y) means an alcohol component to serve as a constitutional unit of the non-linear polyester resin (B), exclusive of the component removed to the outside of the system during a polycondensation reaction], from the viewpoint of fixing properties.

The content of (y1) is more preferably 60 to 93 mol %.

The proportion of the diol (y2) of which the SP value is 11.5 to 16.0 in the non-linear polyester resin (B•P1) is preferably 5 to 50 mol %, more preferably 7 to 40 mol %, from the viewpoint of storage stability.

Specific examples of the above-described aliphatic diol (y1) having a carbon number of 2 to 4 and the above-described diol (y2) of which the SP value is 11.5 to 16.0 include those used in the linear polyester resin (A•P1), with the preferred ones being the same as well.

In the non-linear polyester resin (B), the carboxylic acid component (x) preferably comprises a monocarboxylic acid (x1) and a polycarboxylic acid (x2), from the viewpoint of charging characteristics.

Examples of the monocarboxylic acid (x1) include the above-mentioned monocarboxylic acids, with the preferred ones being the same as well.

In the non-linear polyester resin (B), the amount of the monocarboxylic acid (x1) is preferably 0.5 to 30 mol %, more preferably 1 to 25 mol %, particularly preferably 2 to 20 mol % based on the total amount of the carboxylic acid component (x), from the viewpoint of storage stability.

Examples of the polycarboxylic acid (x2) include the above-mentioned polycarboxylic acids.

Preferred among the dicarboxylic acids (x21) are alkenedicarboxylic acids having a carbon number of 4 to 20, aromatic dicarboxylic acids having a carbon number of 8 to 20, and ester-forming derivatives of these. More preferred are terephthalic acid, isophthalic acid, and/or lower alkyl (the carbon number of the alkyl group: 1 to 4) esters (x211) of these.

Preferred among the trivalent to hexavalent or higher valent polycarboxylic acids (x22) are trimellitic acid, pyromellitic acid, and ester-forming derivatives of these.

The content of terephthalic acid, isophthalic acid, and/or lower alkyl (the carbon number of the alkyl group: 1 to 4) esters (x211) of these in the polycarboxylic acid (x2) is preferably 85 to 100 mol %, more preferably 90 to 100 mol %, from the viewpoint of storage stability.

The mole ratio of terephthalic acid and/or lower alkyl esters thereof to isophthalic acid and/or lower alkyl esters thereof in (x211) is preferably 20:80 to 100:0, more preferably 25:75 to 80:20, from the viewpoint of mechanical strength of the resin.

In the non-linear polyester resin (B), the content of an aromatic carboxylic acid in the carboxylic acid component (x) is preferably 80 to 100 mol %, more preferably 85 to 100 mol %, from the viewpoint of storage stability and fixing properties.

As to the polyester resin (P) as a whole, the content of an aromatic carboxylic acid in (x) is preferably within the above-described range.

In the case of the non-linear polyester resin (B•P1), it is preferable that the carboxylic acid component (x) and/or the alcohol component (y) contain(s) at least one of a monool and a monocarboxylic acid (x1), and more preferable that the carboxylic acid component (x) contains a monocarboxylic acid (x1), from the viewpoint of storage stability and productivity.

When a monool is used, the monool is preferably used in such an amount (calculated value) that 5 mol % or more, more preferably 6 to 85 mol %, particularly preferably 8 to 80 mol %, most preferably 10 to 76 mol % of the terminal carboxyl groups of (B•P1) will be esterified with the monool, from the viewpoint of storage stability and productivity.

When a monocarboxylic acid (x1) is used, the monocarboxylic acid (x1) is preferably used in such an amount (calculated value) that 5 mol % or more, more preferably 6 to 85 mol %, particularly preferably 8 to 80 mol %, most preferably 10 to 76 mol % of the terminal hydroxyl groups of (B•P1) will be esterified with (x1), from the viewpoint of storage stability and productivity.

In production of the non-linear polyester resin (B), reaction conditions of polycondensation of the carboxylic acid component (x) and the alcohol component (y), and a polymerization catalyst to be used are the same as those described regarding the above-mentioned linear polyester resin (A).

In the above-mentioned first stage, when at least a part of the polycarboxylic acid (x2) and the alcohol component (y) undergo polycondensation, the reaction ratio of (y) to at least a part of (x2) is, as an equivalence ratio of hydroxyl groups to carboxyl groups [OH]/[COON], preferably 2/1 to 1/1, more preferably 1.5/1 to 1.01/1, particularly preferably 1.3/1 to 1.02/1.

In addition, the ratio of all the alcohol component (y) and all the carboxylic acid component (x) used in production of (B) is, as an equivalence ratio of hydroxyl groups to carboxyl groups [OH]/[COON], preferably 2/1 to 1/2, more preferably 1.5/1 to 1/1.3, particularly preferably 1.3/1 to 1/1.2.

The SP value of the non-linear polyester resin (B) is preferably 11.5 to 13.0, more preferably 11.8 to 12.8.

When the SP value is 11.5 or more, fixing properties (at high temperature side) are better, and when it is 13.0 or less, blocking resistance is improved.

The glass transition temperature [Tg] of the non-linear polyester resin (B) is preferably 45° C. to 75° C., more preferably 50° C. to 70° C. When Tg is 75° C. or less, low temperature fixing properties are improved. When Tg is 45° C. or more, blocking resistance is good.

The softening point [Tm] of (B) is not particularly limited, but preferably 90° C. to 170° C., more preferably 120° C. to 160° C. When Tm is 90° C. or more, hot offset resistance is good. When Tm is 170° C. or less, fixing properties are good.

Mp of a tetrahydrofuran (THF) soluble component of the non-linear polyester resin (B) is preferably 3000 to 30000, more preferably 3200 to 25000, particularly preferably 3500 to 12000.

A THF insoluble component of the non-linear polyester resin (B) is preferably 3 to 50%, from the viewpoint of low temperature fixing properties. It is more preferably 5 to 40%, particularly preferably 10 to 35%. When the THF insoluble component is 50% or less, the glossiness (gloss) of images is good.

The acid value (AV) of the non-linear polyester resin (B) is preferably 0 to 40, more preferably 3 to 30, and the hydroxyl value (OHV) thereof is preferably 0 to 30, more preferably 0 to 20.

The sum of the acid value and the hydroxyl value of the non-linear polyester resin (B) is preferably 3 to 40, more preferably 10 to 40, particularly preferably 20 to 39. When the sum of the acid value and the hydroxyl value is 3 or more, storage stability is good, and when it is 40 or less, charge stability is improved.

In the case where the polyester resin (P) contains the linear polyester resin (A) and the non-linear polyester resin (B), the weight ratio of (A) to (B) [(A)/(B)] is preferably 15/85 to 90/10, more preferably 20/80 to 80/20, from the viewpoint of achieving both low temperature fixing properties and hot offset resistance/pulverization properties.

The SP value of the polyester resin (P) [this preferably comprises the linear polyester resin (A) and the non-linear polyester resin (B)] contained in the toner binder of the present invention needs to satisfy the below-described expression (1), from the viewpoint of fixing properties and storage stability, and it is preferably 11.6 to 12.9.

$$11.5 \leq \text{SP value of } (P) \leq 13.0 \quad (1)$$

The above-described SP value is, when (P) comprises two or more kinds of polyester resins, a value determined by a weighted average of SP values of each resin.

The HLB value of the polyester resin (P) needs to satisfy the below-described expression (2), from the viewpoint of fixing properties and storage stability, and it is preferably 5.5 to 7.0.

$$5.2 \leq \text{HLB value of } (P) \leq 7.1 \quad (2)$$

The above-described HLB value is, when (P) comprises two or more kinds of polyester resins, a value determined by a weighted average of HLB values of each resin.

Here, the HLB (Hydrophile-Lipophile Balance) means a measure indicating the balance of inorganicity/organicity, and the higher the HLB value is, the higher the inorganicity is. The calculation is made by Oda method according to the below-described expression.

$$\text{HLB} \approx 10 \times \text{inorganicity/organicity}$$

(Reference: "Introduction to Surfactants", 2007, published by Sanyo Chemical Industries, Ltd., P. 212)

The HLB value can be adjusted by the compositions and used amounts of raw materials of (P): the carboxylic acid component (x) and the alcohol component (y).

As a method of adjusting HLB within the above-mentioned range, since a polyester resin (P1) containing 50 to 95 mol % of an aliphatic diol (y1) having a carbon number of 2 to 4 in the alcohol component (y) contained in the polyester resin (P) has, in most cases, an HLB value of more than 7.1, mentioned are the methods (1) and (2), which are employed in at least one of the linear polyester resin (A·P1) and the non-linear polyester resin (B·P1) or preferably in both of them:

(1) a method of using a hydrophobic monomer and making an adjustment by the amount of the hydrophobic monomer to be used, and
(2) a method of decreasing the terminal polar functional groups (hydroxyl group, carboxyl group, etc.).

Specific examples of (2) include, as the above-mentioned methods, a method of esterifying 5 mol % or more of the terminal hydroxyl groups with a monocarboxylic acid, a method of esterifying 5 mol % or more of the terminal carboxyl groups with a monool, and a method of modifying 5 mol % or more of the terminal hydroxyl groups into vinyl groups.

Among these, preferred is the method of (2), and more preferred is a method of performing esterification with a monocarboxylic acid or a monool to block the terminal functional group. Particularly preferred is a method of performing esterification with a monocarboxylic acid.

Further, the polyester resin (P) preferably satisfies the following expression (3). When this expression is satisfied, storage stability and fixing properties are better.

$$\text{Mn} \leq 3.3 \times \text{Tg} \times \text{SP value} \quad (3)$$

When (P) comprises two or more types of polyester resins, Mn and Tg of the whole (P) as a mixture of these, and the SP value (weighted average value) are used.

Also, the linear polyester resin (A) and the non-linear polyester resin (B) constituting (P) preferably satisfy the expression (3).

Examples of a method of obtaining the polyester resin (P) satisfying the expression (3) include a method of increasing the content percentage of an aliphatic diol (y1) having a carbon number of 2 to 4 to increase the SP value, a method of increasing the content percentage of a monocarboxylic acid (x1) to increase Tg relative to Mn, and the like.

The toner binder of the present invention may contain resins other than the polyester resin (P) as long as the effect of the present invention is not impaired. Examples of such other resins include vinyl resins [copolymers of styrene and alkyl(meth)acrylate, copolymers of styrene and diene monomer, etc.], epoxy resins (ring-opening polymers of bisphenol A diglycidylether, etc.), urethane resins (polyadducts of the above-mentioned alcohol component and diisocyanate, etc.), and the like.

The Mp of such other resins is preferably 300 to 100000.

The mixing properties of (A) with (B) in the case where the polyester resin (P) comprises the linear polyester resin (A) and the non-linear polyester resin (B) can be evaluated by observation at 100 or more magnifications (preferably 100 to 5000 magnifications) of a phase-contrast microscope and a digital microscope (high-resolution optical microscope). The toner particle diameter is generally about 5 to 10 μm, and therefore in the case where (A) and (B) forms a sea-island structure, the dispersion particle diameter of the island phase being 5 μm or less is determined as good mixing properties. The dispersion particle diameter is more preferably 4 μm or less, particularly preferably 0.1 to 3 μm. When the dispersion particle diameter is 5 μm or less, low temperature fixing properties and hot offset resistance are good.

Hereinabove and hereinbelow, it is to be noted that the evaluation of mixing properties is performed by the measurement using an IX71 phase-contrast microscope (research inverted microscope) manufactured by OLYMPUS CORPORATION and/or a digital microscope (high-resolution zoom lens VH-Z500R/Z500W) manufactured by KEYENCE CORPORATION.

A toner of the present invention can be made by adding a colorant, and if necessary one or more types of additives such as a release agent, a charge control agent, a magnetic powder, and a fluidizing agent to the toner binder of the present invention.

As the colorant, any dyes, pigments and the like used as colorants for toner can be used. Specific examples thereof include carbon black, iron black, sudan black SM, fast yellow G, benzidine yellow, pigment yellow, indofast orange, Irgazin red, paranitroaniline red, toluidine red, carmine FB, pigment orange R, lake red 2G, rhodamine FB, rhodamine B lake, methyl violet B lake, phthalocyanine blue, pigment blue, brilliant green, phthalocyanine green, oil yellow GG, Kayaset YG, orasol brown B and oil pink OP. These may be used singly or two or more of them may be mixed and used.

If necessary, a magnetic powder (a powder of ferromagnetic metals such as iron, cobalt, and nickel or compounds such as magnetite, hematite, and ferrite) may be contained to serve also as a colorant.

As the release agent, those having a softening point [Tm] of 50 to 170° C. are preferable, and examples thereof include polyolefin wax, natural wax, aliphatic alcohols having a carbon number of 30 to 50, fatty acids having a carbon number of 30 to 50, and mixtures of these. Examples of the polyolefin wax include: (co)polymers of olefins (e.g. ethylene, propylene, 1-butene, isobutylene, 1-hexene, 1-dodecene, 1-octadecene, mixtures of these, etc.) [including those obtained by (co)polymerization and thermally degraded polyolefins], oxides with oxygen and/or ozone of olefin (co)polymers, maleic acid-modified olefin (co)polymers [e.g. products modified with maleic acid and derivatives thereof (maleic anhydride, monomethyl maleate, monobutyl maleate, dimethyl maleate, etc.)], copolymers of olefins and unsaturated carboxylic acids [(meth)acrylic acid, itaconic acid, maleic anhydride, etc.] and/or unsaturated carboxylic acid alkyl esters [(meth)acrylic acid alkyl (the carbon number of alkyl is 1 to 18) esters, maleic acid alkyl (the carbon number of alkyl is 1 to 18) esters, etc.] and the like, sasol wax, and the like.

Examples of the natural wax include carnauba wax, montan wax, paraffin wax and rice wax. Examples of the aliphatic alcohols having a carbon number of 30 to 50 include triacontanol. Examples of the fatty acids having a carbon number of 30 to 50 include triacontan carboxylic acid.

Examples of the charge control agent include nigrosine dyes, triphenylmethane-based dyes containing a tertiary amine as a side chain, quaternary ammonium salts, polyamine resins, imidazole derivatives, quaternary ammonium base-containing polymers, metal-containing azo dyes, copper phthalocyanine dyes, metal salts of salicylic acid, boron complexes of benzilic acid, sulfonic acid group-containing polymers, fluorine-containing polymers, halogen-substituted aromatic ring-containing polymers, and the like.

Examples of the fluidizing agent include colloidal silica, alumina powder, titanium oxide powder, calcium carbonate powder, and the like.

Regarding the compositional ratio of the toner composition of the present invention, based on the weight of the toner, the toner binder of the present invention accounts for preferably 30 to 97%, more preferably 40 to 95%, particularly preferably 45 to 92%; the colorant accounts for preferably 0.05 to 60%, more preferably 0.1 to 55%, particularly preferably 0.5 to 50%; among additives, the release agent accounts for preferably 0 to 30%, more preferably 0.5 to 20%, particularly preferably 1 to 10%; the charge control agent accounts for preferably 0 to 20%, more preferably 0.1 to 10%, particularly preferably 0.5 to 7.5%; and the fluidizing agent accounts for preferably 0 to 10%, more preferably 0 to 5%, particularly preferably 0.1 to 4%. The total content of the additives is preferably 3 to 70%, more preferably 4 to 58%, particularly preferably 5 to 50%. When the compositional ratio of the toner falls within the above-described range, a toner with good charging properties can be easily obtained.

The toner may be obtained by any of conventionally known methods such as a kneading-pulverization method, an emulsion phase-inversion method, and a polymerization method. For example, in obtaining a toner by a kneading-pulverization method, the toner can be produced by dry-blending the components other than a fluidizing agent which are to constitute the toner, melt-kneading and then coarsely pulverizing the blend, finally finely pulverizing the blend using a jet mill pulverizer or the like, further classifying the resultant to form fine particles preferably having a particle diameter (D50) of 5 to 20 μm, and then mixing a fluidizing agent. The average particle diameter (D50) (in the volume particle diameter distribution of a powder, when the number of particles having a particle diameter greater than a certain particle diameter accounts for 50% of the number of particles of whole powder, such a certain particle diameter is determined as D50) is measured using a Coulter counter [e.g. commercial name: Multisizer III (manufactured by Beckman Coulter, Inc.)].

In obtaining a toner by an emulsion phase-inversion method, the toner can be produced by dissolving or dispersing the components other than a fluidizing agent which are to constitute the toner in an organic solvent, emulsifying them, for example, by addition of water, and then conducting separation and classification. The volume average particle diameter of the toner is preferably 3 to 15 μm.

The toner of the present invention using the toner binder of the present invention is mixed with carrier particles such as iron powder, glass beads, nickel powder, ferrite, magnetite, or ferrite the surface of which is coated with a resin (acrylic resin, silicone resin, etc.), if necessary, to be used as a developer of an electric latent image. The weight ratio of the toner to the carrier particles is preferably 1/99 to 100/0. It is also possible to form an electric latent image by friction with a member such as a charging blade instead of carrier particles.

The toner of the present invention is fixed on a support (paper, a polyester film, etc.) by a copier, a printer or the like to be formed into a recorded material. As fixing methods on a support, known heat roll fixing methods, flash fixing methods, and the like can be applied. Fixing methods, flash fixing methods, and the like can be applied.

EXAMPLES

Hereinbelow, the present invention will be described in more detail based upon examples; however, the present invention is not intended to be limited thereto. Hereinbelow, "part(s)" represents "part(s) by weight".

Production Example 1

[Synthesis of Linear Polyester Resin (A-1)]

Into a reaction vessel equipped with a condenser, a stirrer and a nitrogen inlet tube were charged 265 parts (91.4 mol %) of terephthalic acid, 770 parts (100.0 mol %) of a propylene oxide adduct of bisphenol A: Newpol BP-2P (SP value: 12.0) (Manufactured by Sanyo Chemical Industries, Ltd.: 2 moles of propylene oxide adduct), and 3 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg until its acid value reached 2 or less. Then thereto was added 29 parts (8.6 mol %) of trimellitic anhydride at 180° C. and after allowed to react for 1 hour at ordinary pressure, the resulting resin was taken out. The resin obtained was cooled to room temperature and then pulverized to form particles. This was defined as a linear polyester resin (A-1).

The (A-1) had an Mp of 3500, an Mn of 1600, a Tg of 58° C., a Tm of 95° C., an acid value of 15, a hydroxyl value of 65, a THF insoluble component of 1%, an SP value of 11.3 and an HLB value of 4.8.

In addition, mol % in the parentheses represents mol % of each raw material contained in the carboxylic acid component or the alcohol component. The same shall apply hereinafter.

Production Example 2

[Synthesis of Linear Polyester Resin (A-2)]

Into a reaction vessel equipped with a condenser, a stirrer and a nitrogen inlet tube were charged 290 parts (90.3 mol %) of terephthalic acid, 735 parts (100.0 mol %) of a ethylene oxide (hereinafter abbreviated as EO) adduct of bisphenol A: highly purified BPE-20 (SP value: 12.5) (Manufactured by Sanyo Chemical Industries, Ltd.: purity of the 2 moles of EO adduct being 98%), and 3 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg until its acid value reached 2 or less. Then thereto was added 36 parts (9.7 mol %) of trimellitic anhydride at 180° C. and after allowed to react for 1 hour at ordinary pressure, the resulting resin was taken out. The resin obtained was cooled to room temperature and then pulverized to form particles. This was defined as a linear polyester resin (A-2).

The (A-2) had an Mp of 4500, an Mn of 1900, a Tg of 60° C., a Tm of 92° C., an acid value of 22, a hydroxyl value of 50, a THF insoluble component of 1%, an SP value of 11.7 and an HLB value of 4.9.

Production Example 3

[Synthesis of Linear Polyester Resin (A-3) [(A•P1-3)]]

Into a reaction vessel equipped with a condenser, a stirrer and a nitrogen inlet tube were charged 440 parts (62.3 mol %) of terephthalic acid, 189 parts (26.7 mol %) of isophthalic acid, 27 parts (5.2 mol %) of benzoic acid, 431 parts (85.0 mol % after subtracting the recovered 210 parts described below) of ethylene glycol, 219 parts (15.0 mol %) of Newpol BP-2P, and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 43 parts (5.9 mol %) of trimellitic anhydride at 180° C. and after allowed to react for 1 hour at ordinary pressure, the resulting resin was taken out. The amount of recovered ethylene glycol was 210 parts. The resin obtained was cooled to room temperature and then pulverized to form particles. This was defined as a linear polyester resin (A-3).

The (A-3) had an Mp of 5000, an Mn of 2100, a Tg of 60° C., a Tm of 97° C., an acid value of 25, a hydroxyl value of 21, a THF insoluble component of 1%, an SP value of 12.1, an HLB value of 6.5 and an esterification rate of terminal hydroxyl group by monocarboxylic acid of 29 mol %.

Production Example 4

[Synthesis of Linear Polyester Resin (A-4) [(A•P1-4)]]

Into a reaction vessel equipped with a condenser, a stirrer and a nitrogen inlet tube were charged 531 parts (62.8 mol %) of terephthalic acid, 228 parts (26.9 mol %) of isophthalic acid, 39 parts (6.2 mol %) of benzoic acid, 531 parts (85.0 mol % after subtracting the recovered 262 parts described below) of ethylene glycol, 77 parts (15.0 mol %) of neopentyl glycol (SP value: 13.9) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 34 parts (3.9 mol %) of trimellitic anhydride at 180° C. and after allowed to react for 1 hour at ordinary pressure, the resulting resin was taken out. The amount of recovered ethylene glycol was 262 parts. The resin obtained was cooled to room temperature and then pulverized to form particles. This was defined as a linear polyester resin (A-4).

The (A-4) had an Mp of 5700, an Mn of 2350, a Tg of 59° C., a Tm of 102° C., an acid value of 20, a hydroxyl value of 12, a THF insoluble component of 1%, an SP value of 12.3, an HLB value of 7.0 and an esterification rate of terminal hydroxyl group by monocarboxylic acid of 40 mol %.

Production Example 5

[Synthesis of Linear Polyester Resin (A-5) [(A•P1-5)]]

Into a reaction vessel equipped with a condenser, a stirrer and a nitrogen inlet tube were charged 489 parts (59.9 mol %) of terephthalic acid, 187 parts (25.7 mol %) of phthalic anhydride, 67 parts (11.1 mol %) of benzoic acid, 493 parts (90.0 mol % after subtracting the recovered 235 parts described below) of ethylene glycol, 111 parts (10.0 mol %) of hydrogenated bisphenol A (SP value: 12.4) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 26 parts (3.2 mol %) of trimellitic anhydride at 180° C. and after allowed to react for 1 hour at ordinary pressure, the resulting resin was taken out. The amount of recovered ethylene glycol was 235 parts. The resin obtained was cooled to room temperature and then pulverized to form particles. This was defined as a linear polyester resin (A-5).

The (A-5) had an Mp of 4800, an Mn of 2000, a Tg of 59° C., a Tm of 95° C., an acid value of 15, a hydroxyl value of 8, a THF insoluble component of 1%, an SP value of 12.2, an HLB value of 6.4 and an esterification rate of terminal hydroxyl group by monocarboxylic acid of 48 mol %.

Production Example 6

[Synthesis of Linear Polyester Resin (A-6) [(A•P1-6)]]

Into a reaction vessel equipped with a condenser, a stirrer and a nitrogen inlet tube were charged 408 parts (56.8 mol %) of terephthalic acid, 175 parts (24.4 mol %) of isophthalic acid, 86 parts (16.3 mol %) of benzoic acid, 386 parts (80.0 mol % after subtracting the recovered 187 parts described below) of ethylene glycol, 253 parts (20.0 mol %) of highly purified BPE-20 and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 17 parts (2.5 mol %) of trimellitic anhydride at 180° C. and after allowed to react for 1 hour at ordinary pressure, the resulting resin was taken out. The amount of recovered ethylene glycol was 187 parts. The resin obtained was cooled to room temperature and then pulverized to form particles. This was defined as a linear polyester resin (A-6).

The (A-6) had an Mp of 4000, an Mn of 1700, a Tg of 58° C., a Tm of 93° C., an acid value of 11, a hydroxyl value of 10, a THF insoluble component of 1%, an SP value of 12.0, an HLB value of 5.8 and an esterification rate of terminal hydroxyl group by monocarboxylic acid of 74 mol %.

Production Example 7

[Synthesis of Linear Polyester Resin (A-7) [(A•P1-7)]]

Into a reaction vessel equipped with a condenser, a stirrer and a nitrogen inlet tube were charged 455 parts (60.7 mol %) of terephthalic acid, 195 parts (26.0 mol %) of isophthalic acid, 80 parts (9.9 mol %) of p-t-butyl benzoic acid, 459 parts (90.0 mol % after subtracting the recovered 216 parts described below) of ethylene glycol, 147 parts (10.0 mol %) of 2 moles of EO adduct of bisphenol S (SP value: 15.7) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 26 parts (3.4 mol %) of trimellitic anhydride at 180° C. and after allowed to react for 1 hour at ordinary pressure, the resulting resin was taken out. The amount of recovered ethylene glycol was 216 parts. The resin obtained was cooled to room temperature and then pulverized to form particles. This was defined as a linear polyester resin (A-7).

The (A-7) had an Mp of 4400, an Mn of 1800, a Tg of 61° C., a Tm of 95° C., an acid value of 15, a hydroxyl value of 17, a THF insoluble component of 1%, an SP value of 12.4, an HLB value of 6.8 and an esterification rate of terminal hydroxyl group by monocarboxylic acid of 55 mol %.

Production Example 8

[Synthesis of Linear Polyester Resin (A-8) [(A•P1-8)]]

Into a reaction vessel equipped with a condenser, a stirrer and a nitrogen inlet tube were charged 326 parts (45.3 mol %) of terephthalic acid, 326 parts (45.3 mol %) of isophthalic acid, 39 parts (5.0 mol %) of p-t-butyl benzoic acid, 447 parts (85.0 mol % after subtracting the recovered 218 parts described below) of ethylene glycol, 188 parts (15.0 mol %) of 2 moles of EO adduct of bisphenol F (SP value: 13.2) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 34 parts (4.5 mol %) of trimellitic anhydride at 180° C. and after allowed to react for 1 hour at ordinary pressure, the resulting resin was taken out. The amount of recovered ethylene glycol was 218 parts. The resin obtained was cooled to room temperature and then pulverized to form particles. This was defined as a linear polyester resin (A-8).

The (A-8) had an Mp of 4800, an Mn of 2000, a Tg of 60° C., a Tm of 98° C., an acid value of 20, a hydroxyl value of 26, a THF insoluble component of 1%, an SP value of 12.3, an HLB value of 6.5 and an esterification rate of terminal hydroxyl group by monocarboxylic acid of 29 mol %.

Production Example 9

[Synthesis of Linear Polyester Resin (A-9) [(A•P1-9)]]

Into a reaction vessel equipped with a condenser, a stirrer and a nitrogen inlet tube were charged 424 parts (51.8 mol %) of terephthalic acid, 252 parts (34.5 mol %) of phthalic anhydride, 51 parts (8.4 mol %) of benzoic acid, 485 parts (85.0 mol % after subtracting the recovered 241 parts described below) of ethylene glycol, 114 parts (15.0 mol %) of cyclohexanedimethanol (SP value: 15.8) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 43 parts (5.2 mol %) of trimellitic anhydride at 180° C. and after allowed to react for 1 hour at ordinary pressure, the resulting resin was taken out. The amount of recovered ethylene glycol was 241 parts. The resin obtained was cooled to room temperature and then pulverized to form particles. This was defined as a linear polyester resin (A-9).

The (A-9) had an Mp of 5400, an Mn of 2250, a Tg of 57° C., a Tm of 101° C., an acid value of 25, a hydroxyl value of 6, a THF insoluble component of 1%, an SP value of 12.4, an HLB value of 6.9 and an esterification rate of terminal hydroxyl group by monocarboxylic acid of 59 mol %.

Production Example 10

[Synthesis of Linear Polyester Resin (A-10) [(A•P1-10)]]

Into a reaction vessel equipped with a condenser, a stirrer and a nitrogen inlet tube were charged 517 parts (60.9 mol %) of terephthalic acid, 222 parts (26.1 mol %) of isophthalic acid, 57 parts (9.0 mol %) of benzoic acid, 508 parts (85.0 mol % after subtracting the recovered 256 parts described below) of ethylene glycol, 85 parts (15.0 mol %) of 2,3-dimethylbutane-1,4-diol (SP value: 13.2) and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 34 parts (4.0 mol %) of trimellitic anhydride at 180° C. and after allowed to react for 1 hour at ordinary pressure, the resulting resin was taken out. The amount of recovered ethylene glycol was 256 parts. The resin obtained was cooled to room temperature and then pulverized to form particles. This was defined as a linear polyester resin (A-10).

The (A-10) had an Mp of 6000, an Mn of 2400, a Tg of 62° C., a Tm of 104° C., an acid value of 20, a hydroxyl value of 1, a THF insoluble component of 1%, an SP value of 12.1, an HLB value of 6.7 and an esterification rate of terminal hydroxyl group by monocarboxylic acid of 72 mol %.

Production Example 11

[Synthesis of Linear Polyester Resin (A-11) [ (A•P1-11)]]

Into a reaction vessel equipped with a condenser, a stirrer and a nitrogen inlet tube were charged 483 parts (58.9 mol %) of terephthalic acid, 185 parts (25.3 mol %) of phthalic anhydride, 77 parts (12.7 mol %) of benzoic acid, 597 parts (90.0 mol % after subtracting the recovered 279 parts described below) of 1,2-propylene glycol, 48 parts (10.0 mol %) of neopentyl glycol and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 26 parts (3.2 mol %) of trimellitic anhydride at 180° C. and after allowed to react for 1 hour at ordinary pressure, the resulting resin was taken out. The amount of recovered 1,2-propylene glycol was 279 parts. The resin obtained was cooled to room temperature and then pulverized to form particles. This was defined as a linear polyester resin (A-11).

The (A-11) had an Mp of 4100, an Mn of 1700, a Tg of 63° C., a Tm of 97° C., an acid value of 15, a hydroxyl value of 12, a THF insoluble component of 10, an SP value of 11.8, an HLB value of 6.6 and an esterification rate of terminal hydroxyl group by monocarboxylic acid of 67 mol %.

Production Example 12

[Synthesis of Linear Polyester Resin (A-12) [(A•P1-12)]]

Into a reaction vessel equipped with a condenser, a stirrer and a nitrogen inlet tube were charged 428 parts (62.5 mol %) of terephthalic acid, 183 parts (26.8 mol %) of isophthalic acid, 61 parts (5.2 mol %) of stearic acid, 418 parts (85.0 mol % after subtracting the recovered 208 parts described below) of ethylene glycol, 209 parts (15.0 mol %) of Newpol BP-2P and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 43 parts (5.7 mol %) of trimellitic anhydride at 180° C. and after allowed to react for 1 hour at ordinary pressure, the resulting resin was taken out. The amount of recovered ethylene glycol was 208 parts. The resin obtained was cooled to room temperature and then pulverized to form particles. This was defined as a linear polyester resin (A-12).

The (A-12) had an Mp of 6000, an Mn of 2200, a Tg of 59° C., a Tm of 102° C., an acid value of 25, a hydroxyl value of 13, a THF insoluble component of 1%, an SP value of 11.8, an HLB value of 6.1 and an esterification rate of terminal hydroxyl group by monocarboxylic acid of 37 mol %.

Production Example 13

[Synthesis of Linear Polyester Resin (A-13) [(A•P1-13)]]

Into a reaction vessel equipped with a condenser, a stirrer and a nitrogen inlet tube were charged 467 parts (66.4 mol %) of terephthalic acid, 200 parts (28.4 mol %) of isophthalic acid, 495 parts (82.0 mol % after subtracting the recovered 268 parts described below) of ethylene glycol, 97 parts (9.0 mol %) of hydrogenated bisphenol A, 109 parts (9.0 mol %) of stearyl alcohol and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 43 parts (5.2 mol %) of trimellitic anhydride at 180° C. and after allowed to react for 1 hour at ordinary pressure, the resulting resin was taken out. The amount of recovered ethylene glycol was 268 parts. The resin obtained was cooled to room temperature and then pulverized to form particles. This was defined as a linear polyester resin (A-13).

The (A-13) had an Mp of 8000, an Mn of 3000, a Tg of 61° C., a Tm of 109° C., an acid value of 25, a hydroxyl value of 17, a THF insoluble component of 1%, an SP value of 11.8, an HLB value of 6.2 and an esterification rate of terminal carboxylic group by monool of 33 mol %.

Production Example 14

[Synthesis of Linear Polyester Resin (A-14) [(A•P1-14)]]

Into a reaction vessel equipped with a condenser, a stirrer and a nitrogen inlet tube were charged 545 parts (66.9 mol %) of terephthalic acid, 234 parts (28.7 mol %) of isophthalic acid, 535 parts (85.0 mol % after subtracting the recovered 269 parts described below) of ethylene glycol, 79 parts (15.0 mol %) of neopentyl glycol and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 43 parts (4.7 mol %) of trimellitic anhydride at 180° C. and after allowed to react for 1 hour at ordinary pressure, 1 part of concentrated sulfuric acid was added and further allowed to react for 1 hour at ordinary pressure and the resulting resin was taken out. The amount of recovered ethylene glycol was 269 parts. The resin obtained was cooled to room temperature and then pulverized to form particles. This was defined as a linear polyester resin (A-14).

The (A-14) had an Mp of 5900, an Mn of 2400, a Tg of 59° C., a Tm of 103° C., an acid value of 25, a hydroxyl value of 10, a THF insoluble component of 2%, an SP value of 12.2, an HLB value of 7.0 and a modification rate of terminal hydroxyl group to vinyl group of 75 mol %.

Production Example 15

[Synthesis of Non-Linear Polyester Resin (B-1) [(B•P1-1)]]

Into a reaction vessel equipped with a condenser, a stirrer and a nitrogen inlet tube were charged 475 parts (60.4 mol %) of terephthalic acid, 120 parts (15.2 mol %) of isophthalic acid, 105 parts (15.2 mol %) of adipic acid, 300 parts (50.0 mol % after subtracting the recovered 157 parts described below) of ethylene glycol, 240 parts (50.0 mol %) of neopentyl glycol and 0.5 part of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 7 parts (1.2 mol %) of benzoic acid and allowed to react for 3 hours at ordinary pressure. Further, thereto was added 73 parts (8.0 mol %) of trimellitic anhydride and after allowed to react for 1 hour at ordinary pressure, it was allowed to react under a reduced pressure of 20 to 40 mmHg and the resulting resin was taken out when its softening point reached 145° C. The amount of recovered ethylene glycol was 157 parts. The resin obtained was cooled to room temperature and then pulverized to form particles. This was defined as a non-linear polyester resin (B-1).

The (B-1) had an Mp of 8000, an Mn of 2200, a Tg of 60° C., a Tm of 145° C., an acid value of 26, a hydroxyl value of 1, a THF insoluble component of 4%, an SP value of 11.8, an HLB value of 6.9 and an esterification rate of terminal hydroxyl group by monocarboxylic acid of 19 mol %.

Production Example 16

[Synthesis of Non-Linear Polyester Resin (B-2) [(B•P1-2)]]

Into a reaction vessel equipped with a condenser, a stirrer and a nitrogen inlet tube were charged 555 parts (67.8 mol %) of terephthalic acid, 140 parts (17.1 mol %) of isophthalic acid, 1 part (0.1 mol %) of adipic acid, 430 parts (69.6 mol % after subtracting the recovered 225 parts described below) of ethylene glycol, 150 parts (30.4 mol %) of neopentyl glycol and 0.5 part of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 36 parts (6.0 mol %) of benzoic acid and allowed to react for 3 hours at ordinary pressure. Further, thereto was added 85 parts (9.0 mol %) of trimellitic anhydride and after allowed to react for 1 hour at ordinary pressure, it was allowed to react under a reduced pressure of 20 to 40 mmHg and the resulting resin was taken out when its softening point reached 150° C. The amount of recovered ethylene glycol was 225 parts. The resin obtained was cooled to room temperature and then pulverized to form particles. This was defined as a non-linear polyester resin (B-2).

The (B-2) had an Mp of 4500, an Mn of 1500, a Tg of 63° C., a Tm of 150° C., an acid value of 23, a hydroxyl value of 5, a THF insoluble component of 8%, an SP value of 12.0, an HLB value of 6.8 and an esterification rate of terminal hydroxyl group by monocarboxylic acid of 60 mol %.

Production Example 17

[Synthesis of Non-Linear Polyester Resin (B-3) [(B•P1-3)]]

Into a reaction vessel equipped with a condenser, a stirrer and a nitrogen inlet tube were charged 209 parts (25.5 mol %) of terephthalic acid, 486 parts (59.3 mol %) of isophthalic acid, 1 part (0.1 mol %) of adipic acid, 430 parts (69.6 mol % after subtracting the recovered 225 parts described below) of ethylene glycol, 150 parts (30.4 mol %) of neopentyl glycol and 0.5 part of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 53 parts (6.0 mol %) of p-t-butyl benzoic acid and allowed to react for 3 hours at ordinary pressure. Further, thereto was added 85 parts (9.0 mol %) of trimellitic anhydride and after allowed to react for 1 hour at ordinary pressure, it was allowed to react under a reduced pressure of 20 to 40 mmHg and the resulting resin was taken out when its softening point reached 148° C. The amount of recovered ethylene glycol was 225 parts. The resin obtained was cooled to room temperature and then pulverized to form particles. This was defined as a non-linear polyester resin (B-3).

The (B-3) had an Mp of 5200, an Mn of 1900, a Tg of 61° C., a Tm of 148° C., an acid value of 24, a hydroxyl value of 5, a THF insoluble component of 6%, an SP value of 12.0, an HLB value of 6.8 and an esterification rate of terminal hydroxyl group by monocarboxylic acid of 51 mol %.

Production Example 18

[Synthesis of Non-Linear Polyester Resin (B-4) [(B•P1-4)]]

Into a reaction vessel equipped with a condenser, a stirrer and a nitrogen inlet tube were charged 330 parts (40.5 mol %) of terephthalic acid, 330 parts (40.5 mol %) of isophthalic acid, 1 part (0.1 mol %) of adipic acid, 536 parts (90.0 mol % after subtracting the recovered 255 parts described below) of ethylene glycol, 52 parts (10.0 mol %) of neopentyl glycol and 0.5 part of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 88 parts (10.0 mol %) of p-t-butyl benzoic acid and allowed to react for 3 hours at ordinary pressure. Further, thereto was added 83 parts (8.9 mol %) of trimellitic anhydride and after allowed to react for 1 hour at ordinary pressure, it was allowed to react under a reduced pressure of 20 to 40 mmHg and the resulting resin was taken out when its softening point reached 151° C. The amount of recovered ethylene glycol was 255 parts. The resin obtained was cooled to room temperature and then pulverized to form particles. This was defined as a non-linear polyester resin (B-4).

The (B-4) had an Mp of 4600, an Mn of 1600, a Tg of 62° C., a Tm of 151° C., an acid value of 16, a hydroxyl value of 7, a THF insoluble component of 6%, an SP value of 11.9, an HLB value of 6.9 and an esterification rate of terminal hydroxyl group by monocarboxylic acid of 64 mol %.

Production Example 19

[Synthesis of Non-Linear Polyester Resin (B-5) [(B•P1-5)]]

Into a reaction vessel equipped with a condenser, a stirrer and a nitrogen inlet tube were charged 368 parts (51.7 mol %) of terephthalic acid, 158 parts (22.1 mol %) of isophthalic acid, 355 parts (85.0 mol % after subtracting the recovered 137 parts described below) of ethylene glycol, 215 parts (15.0 mol %) of Newpol BP-2P and 0.5 part of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 70 parts (13.3 mol %) of benzoic acid and allowed to react for 3 hours at ordinary pressure. Further, thereto was added 107 parts (12.9 mol %) of trimellitic anhydride and after allowed to react for 1 hour at ordinary pressure, it was allowed to react under a reduced pressure of 20 to 40 mmHg and the resulting resin was taken out when its softening point reached 155° C. The amount of recovered ethylene glycol was 137 parts. The resin obtained was cooled to room temperature and then pulverized to form particles. This was defined as a non-linear polyester resin (B-5).

The (B-5) had an Mp of 4800, an Mn of 1700, a Tg of 63° C., a Tm of 155° C., an acid value of 20, a hydroxyl value of 1, a THF insoluble component of 20%, an SP value of 12.0, an HLB value of 6.2 and an esterification rate of terminal hydroxyl group by monocarboxylic acid of 76 mol %.

Comparative Production Example 1

[Synthesis of Comparative Linear Polyester Resin (RA-1)]

Into a reaction vessel equipped with a condenser, a stirrer and a nitrogen inlet tube were charged 557 parts (67.4 mol %) of terephthalic acid, 239 parts (28.9 mol %) of isophthalic acid, 563 parts (90.0 mol % after subtracting the recovered 276 parts described below) of ethylene glycol, 53 parts (10.0 mol %) of neopentyl glycol and 2.5 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 34 parts (3.7 mol %) of trimellitic anhydride at 180° C. and after allowed to react for 1 hour at ordinary pressure, the resulting resin was taken out. The amount of recovered ethylene glycol was 276 parts. The resin obtained was cooled to room temperature and then pulverized to form particles. This was defined as a linear polyester resin (RA-1).

The (RA-1) had an Mp of 6100, an Mn of 2500, a Tg of 59° C., a Tm of 103° C., an acid value of 20, a hydroxyl value of 29, a THF insoluble component of 1%, an SP value of 12.5 and an HLB value of 7.5.

Comparative Production Example 2

[Synthesis of Comparative Linear Polyester Resin (RA-2)]

Into a reaction vessel equipped with a condenser, a stirrer and a nitrogen inlet tube were charged 260 parts (71.2 mol %) of terephthalic acid, 25 parts (7.9 mol %) of adipic acid, 42 parts (15.8 mol %) of benzoic acid, 722 parts (100.0 mol %) of Newpol BP-2P and 3 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 17 parts (5.1 mol %) of trimellitic anhydride at 180° C. and after allowed to react for 1 hour at ordinary pressure, the resulting resin was taken out. The resin obtained was cooled to room temperature and then pulverized to form particles. This was defined as a linear polyester resin (RA-2).

The (RA-2) had an Mp of 6000, an Mn of 2600, a Tg of 62° C., a Tm of 94° C., an acid value of 10, a hydroxyl value of 14, a THF insoluble component of 1%, an SP value of 11.0, an HLB value of 4.1 and an esterification rate of terminal hydroxyl group by monocarboxylic acid of 54 mol %.

Comparative Production Example 3

[Synthesis of Comparative Non-Linear Polyester Resin (RB-1)]

Into a reaction vessel equipped with a condenser, a stirrer and a nitrogen inlet tube were charged 463 parts (56.3 mol %) of terephthalic acid, 305 parts (35.9 mol %) of isophthalic acid, 575 parts (100.0 mol %) of ethylene glycol and 3 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 9 parts (1.5 mol %) of benzoic acid and allowed to react for 3 hours at ordinary pressure. Then thereto was added 87 parts (8.7 mol %) of trimellitic anhydride and after allowed to react for 1 hour at ordinary pressure, it was allowed to react under a reduced pressure of 20 to 40 mmHg and the resulting resin was taken out when its softening point reached 140° C. The amount of recovered ethylene glycol was 200 parts. The resin obtained was cooled to room temperature and then pulverized to form particles. This was defined as a non-linear polyester resin (RB-1).

The (RB-1) had an Mp of 8500, an Mn of 2600, a Tg of 57° C., a Tm of 140° C., an acid value of 30, a hydroxyl value of 5, a THF insoluble component of 5%, an SP value of 12.6, an HLB value of 7.5 and an esterification rate of terminal hydroxyl group by monocarboxylic acid of 21 mol %.

Comparative Production Example 4

[Synthesis of Comparative Non-Linear Polyester Resin (RB-2)]

Into a reaction vessel equipped with a condenser, a stirrer and a nitrogen inlet tube were charged 415 parts (54.6 mol %) of terephthalic acid, 275 parts (36.4 mol %) of isophthalic acid, 345 parts (40.0 mol % after subtracting the recovered 235 parts described below) of ethylene glycol, 285 parts of neopentyl glycol (60.0 mol %) and 3 parts of titanium diisopropoxy bis(triethanol aminate) serving as a polymerization catalyst, and these were allowed to react at 210° C. under a nitrogen gas flow for 5 hours while generated water being distilled off. Next, this was allowed to react under a reduced pressure of 5 to 20 mmHg for 1 hour. Then thereto was added 77 parts (8.8 mol %) of trimellitic anhydride and after allowed to react for 1 hour at ordinary pressure, it was allowed to react under a reduced pressure of 20 to 40 mmHg and the resulting resin was taken out when its softening point reached 145° C. The amount of recovered ethylene glycol was 235 parts. The resin obtained was cooled to room temperature and then pulverized to form particles. This was defined as a non-linear polyester resin (RB-2).

The (RB-2) had an Mp of 8500, an Mn of 2400, a Tg of 58° C., a Tm of 145° C., an acid value of 24, a hydroxyl value of 3, a THF insoluble component of 4%, an SP value of 11.7 and an HLB value of 6.7.

The major analytical data of the polyester resins (A-1) to (A-14), (B-1) to (B-5) obtained in the Production Examples 1 to 19, and the polyester resins (RA-1), (RA-2), (RB-1) and (RB-2) obtained in the Comparative Production Examples 1 to 4 are summarized in the following Table 1.

TABLE 1

| | | Polyester resin | Mp | Mn | Tg | Tm | AV | OHV | SP value | HLB value | 3.3 * Tg * SP value |
|---|---|---|---|---|---|---|---|---|---|---|---|
| Production Example | 1 | A-1 | 3,500 | 1,600 | 58 | 95 | 15 | 65 | 11.3 | 4.8 | 2,163 |
| | 2 | A-2 | 4,500 | 1,900 | 60 | 92 | 22 | 50 | 11.7 | 4.9 | 2,317 |
| | 3 | A-3 | 5,000 | 2,100 | 60 | 97 | 25 | 21 | 12.1 | 6.5 | 2,396 |
| | 4 | A-4 | 5,700 | 2,350 | 59 | 102 | 20 | 12 | 12.3 | 7.0 | 2,395 |
| | 5 | A-5 | 4,800 | 2,000 | 59 | 95 | 15 | 8 | 12.2 | 6.4 | 2,375 |
| | 6 | A-6 | 4,000 | 1,700 | 58 | 93 | 11 | 10 | 12.0 | 5.8 | 2,297 |
| | 7 | A-7 | 4,400 | 1,800 | 61 | 95 | 15 | 17 | 12.4 | 6.8 | 2,496 |
| | 8 | A-8 | 4,800 | 2,000 | 60 | 98 | 20 | 26 | 12.3 | 6.5 | 2,435 |
| | 9 | A-9 | 5,400 | 2,250 | 57 | 101 | 25 | 6 | 12.4 | 6.9 | 2,332 |

TABLE 1-continued

|  |  | Polyester resin | Mp | Mn | Tg | Tm | AV | OHV | SP value | HLB value | 3.3 * Tg * SP value |
|---|---|---|---|---|---|---|---|---|---|---|---|
|  | 10 | A-10 | 6,000 | 2,400 | 62 | 104 | 20 | 1 | 12.1 | 6.7 | 2,476 |
|  | 11 | A-11 | 4,100 | 1,700 | 63 | 97 | 15 | 12 | 11.8 | 6.6 | 2,453 |
|  | 12 | A-12 | 6,000 | 2,200 | 59 | 102 | 25 | 13 | 11.8 | 6.1 | 2,297 |
|  | 13 | A-13 | 8,000 | 3,000 | 61 | 109 | 25 | 17 | 11.8 | 6.2 | 2,375 |
|  | 14 | A-14 | 5,900 | 2,400 | 59 | 103 | 25 | 10 | 12.3 | 7.1 | 2,395 |
|  | 15 | B-1 | 8,000 | 2,200 | 60 | 145 | 26 | 1 | 11.8 | 6.9 | 2,336 |
|  | 16 | B-2 | 4,500 | 1,500 | 63 | 150 | 23 | 5 | 12.0 | 6.8 | 2,495 |
|  | 17 | B-3 | 5,200 | 1,900 | 61 | 148 | 24 | 5 | 12.0 | 6.8 | 2,416 |
|  | 18 | B-4 | 4,600 | 1,600 | 62 | 151 | 16 | 7 | 11.9 | 6.9 | 2,435 |
|  | 19 | B-5 | 4,800 | 1,700 | 63 | 155 | 20 | 1 | 12.0 | 6.2 | 2,495 |
| Comparative Production Example | 1 | RA-1 | 6,100 | 2,500 | 59 | 103 | 20 | 29 | 12.5 | 7.5 | 2,434 |
|  | 2 | RA-2 | 6,000 | 2,600 | 62 | 94 | 10 | 14 | 11.0 | 4.1 | 2,251 |
|  | 3 | RB-1 | 8,500 | 2,600 | 57 | 140 | 30 | 5 | 12.6 | 7.5 | 2,370 |
|  | 4 | RB-2 | 8,500 | 2,400 | 58 | 145 | 24 | 3 | 11.7 | 6.7 | 2,239 |

Examples 1 to 23, Comparative Examples 1 to 4

The linear polyester resins (A), the non-linear polyester resins (B), the comparative linear polyester resins (RA), and the comparative non-linear polyester resins (RB) obtained in Production Examples 1 to 19 and Comparative Production Examples 1 to 4 were each charged into a plastomill at the ratio shown in Table 2, and stirred at 140° C. for 10 minutes for melt-mixing, so that toner binders (TB-1) to (TB-23) of the present invention composed of the polyester resin (P) and comparative toner binders (TB'-1) to (TB'-4) were obtained. Based on 100 parts of each toner binder, 8 parts of cyanine blue KRO (manufactured by Sanyo Color Works, Ltd.) and 5 parts of carnauba wax were added. The obtained mixture was made into a toner by the below-described method.

First, the obtained mixture was premixed using a Henschel mixer [FM10B manufactured by Mitsui Miike Kakoki KK.] and kneaded in a twin-screw kneader [PCM-30 manufactured by Ikegai Corp.]. The mixture was then finely pulverized using a supersonic jet pulverizer Labojet [manufactured by Nippon Pneumatic Mfg. Co., Ltd.], followed by classification using an air classifier [MDS-I manufactured by Nippon Pneumatic Mfg. Co., Ltd.] to obtain toner particles having a volume average particle diameter (D50) of 8 μm. Then, 0.5 parts of colloidal silica (Aerosil R972: manufactured by Nippon Aerosil Co., Ltd.) was mixed with 100 parts of the toner particles in a sample mill to obtain toners (T-1) to (T-23) of the present invention and comparative toners (T'-1) to (T'-4).

Physical property values of the polyester resin (P) and the results of evaluations made by the below-described evaluation methods are shown in Table 2.

TABLE 2

|  |  |  | Toner binder | | Physical properties of polyester resin (P) | | | | Fixing properties | | Blocking resistance | Saturated charge amount | Charge rising properties | Charge stability | Mixing properties Dispersion particle diameter (μm) |
|---|---|---|---|---|---|---|---|---|---|---|---|---|---|---|---|
|  |  | Toner No. | A | B | SP value | HLB value | Mn | 3.3 * Tg * SP value | MFT, °C. | HOT, °C. | | | | | |
| Example | 1 | T-1 | TB-1 | A-180 | B-120 | 11.4 | 5.2 | 1,700 | 2,197 | 120 | 225 | ○ | ⊙ | ⊙ | ⊙ | 1.3 |
|  | 2 | T-2 | TB-2 | A-180 | B-220 | 11.4 | 5.2 | 1,600 | 2,224 | 125 | 230 | ⊙ | ○ | ○ | ⊙ | 0.9 |
|  | 3 | T-3 | TB-3 | A-280 | B-120 | 11.7 | 5.3 | 2,000 | 2,321 | 120 | 225 | ⊙ | ⊙ | ⊙ | ⊙ | 0.6 |
|  | 4 | T-4 | TB-4 | A-250 | B-150 | 11.8 | 5.9 | 2,000 | 2,327 | 125 | 230 | ⊙ | ⊙ | ⊙ | ⊙ | 0.8 |
|  | 5 | T-5 | TB-5 | A-220 | B-180 | 11.8 | 6.5 | 2,100 | 2,332 | 130 | 230 | ○ | ⊙ | ⊙ | ⊙ | 1.4 |
|  | 6 | T-6 | TB-6 | A-280 | B-220 | 11.8 | 5.3 | 1,800 | 2,352 | 115 | 225 | ⊙ | ⊙ | ⊙ | ⊙ | 0.8 |
|  | 7 | T-7 | TB-7 | A-380 | B-120 | 12.0 | 6.6 | 2,100 | 2,384 | 115 | 220 | ⊙ | ⊙ | ⊙ | ⊙ | 0.6 |
|  | 8 | T-8 | TB-8 | A-470 | B-230 | 12.2 | 6.9 | 2,100 | 2,426 | 115 | 225 | ⊙ | ⊙ | ⊙ | ⊙ | 0.8 |
|  | 9 | T-9 | TB-9 | A-560 | B-340 | 12.1 | 6.6 | 2,000 | 2,392 | 125 | 230 | ⊙ | ○ | ○ | ⊙ | 1.3 |
|  | 10 | T-10 | TB-10 | A-680 | B-420 | 12.0 | 5.9 | 1,700 | 2,328 | 115 | 225 | ⊙ | ⊙ | ⊙ | ⊙ | 0.9 |
|  | 11 | T-11 | TB-11 | A-770 | B-130 | 12.2 | 6.8 | 2,000 | 2,448 | 120 | 220 | ⊙ | ○ | ○ | ⊙ | 0.7 |
|  | 12 | T-12 | TB-12 | A-860 | B-240 | 12.2 | 6.6 | 1,800 | 2,460 | 125 | 230 | ⊙ | ⊙ | ⊙ | ⊙ | 1.4 |
|  | 13 | T-13 | TB-13 | A-950 | B-350 | 12.2 | 6.9 | 2,100 | 2,371 | 125 | 230 | ⊙ | ⊙ | ⊙ | ⊙ | 0.7 |
|  | 14 | T-14 | TB-14 | A-1070 | B-430 | 12.1 | 6.6 | 2,100 | 2,470 | 120 | 230 | ⊙ | ⊙ | ⊙ | ⊙ | 0.8 |
|  | 15 | T-15 | TB-15 | A-1180 | B-120 | 11.8 | 6.7 | 1,900 | 2,430 | 115 | 220 | ⊙ | ⊙ | ⊙ | ⊙ | 0.9 |
|  | 16 | T-16 | TB-16 | A-320 | B-280 | 12.0 | 6.7 | 1,700 | 2,475 | 125 | 230 | ⊙ | ⊙ | ⊙ | ⊙ | 0.7 |
|  | 17 | T-17 | TB-17 | A-430 | B-170 | 12.0 | 6.9 | 2,300 | 2,354 | 120 | 230 | ⊙ | ⊙ | ⊙ | ⊙ | 0.8 |
|  | 18 | T-18 | TB-18 | A-530 | B-470 | 8.3 | 4.3 | 1,700 | 1,665 | 130 | 230 | ⊙ | ⊙ | ⊙ | ⊙ | 1.3 |
|  | 19 | T-19 | TB-19 | A-650 | B-350 | 6.2 | 3.5 | 1,800 | 1,217 | 120 | 230 | ⊙ | ⊙ | ⊙ | ⊙ | 0.8 |
|  | 20 | T-20 | TB-20 | A-360 | B-540 | 12.1 | 6.4 | 1,900 | 2,434 | 115 | 230 | ⊙ | ⊙ | ⊙ | ⊙ | 1.0 |
|  | 21 | T-21 | TB-21 | A-1260 | B-240 | 11.9 | 6.4 | 2,000 | 2,372 | 125 | 210 | ○ | ⊙ | ⊙ | ⊙ | 1.5 |
|  | 22 | T-22 | TB-22 | A-1360 | B-540 | 11.9 | 6.2 | 2,700 | 2,422 | 130 | 210 | ⊙ | ⊙ | ⊙ | ⊙ | 1.6 |
|  | 23 | T-23 | TB-23 | A-1450 | B-350 | 12.1 | 6.5 | 2,200 | 2,396 | 125 | 210 | ○ | ○ | ○ | ○ | 1.4 |

TABLE 2-continued

| | | | Toner binder | | Physical properties of polyester resin (P) | | | | | | | | | Mixing properties |
| | | | | | SP value | HLB value | Mn | 3.3 * Tg * SP value | Fixing properties MFT, °C. | HOT, °C. | Blocking resistance | Saturated charge amount | Charge rising properties | Charge stability | Dispersion particle diameter (μm) |
| | Toner | No. | A | B | | | | | | | | | | | |
|---|---|---|---|---|---|---|---|---|---|---|---|---|---|---|---|
| Comparative Example | 1 | T'-1 | TB'-1 | RA-180 B-120 | 12.4 | 7.4 | 2,500 | 2,415 | 135 | 190 | X | X | X | X | 10 or more |
| | 2 | T'-2 | TB'-2 | RA-270 B-230 | 11.3 | 4.9 | 4,000 | 2,476 | 140 | 220 | Δ | X | Δ | Δ | 2.1 |
| | 3 | T'-3 | TB'-3 | A-330 RB-170 | 12.5 | 7.2 | 2,400 | 2,379 | 140 | 190 | X | X | X | X | 10 or more |
| | 4 | T'-4 | TB'-4 | A-150 RB-250 | 11.5 | 5.8 | 2,000 | 2,201 | 135 | 220 | Δ | Δ | Δ | Δ | 1.6 |

[Evaluation Method]
[1] Minimum Fixing Temperature (MFT)

An unfixed image developed by a commercially available copier (AR5030; manufactured by SHARP CORPORATION) was evaluated by using a fixing device of the commercially available copier (AR5030; manufactured by SHARP CORPORATION). The fixing roll temperature at which the remaining percentage of the image density after the fixed image was rubbed with a pad became 70% or more was defined as a minimum fixing temperature.

[2] Hot Offset Occurrence Temperature (HOT)

In the same manner as the above-described MFT, evaluation of fixing was made, and the presence or absence of hot offset on a fixed image was evaluated visually. The fixing roll temperature at which hot offset occurred was defined as a hot offset occurrence temperature.

It is important for the minimum fixing temperature (MFT) and the hot offset occurrence temperature (HOT) to have a broad range of fixing temperatures (the difference between HOT and MFT).

[3] Storage Stability (Blocking Resistance)

Each of the toners was charged into a polyethylene bottle and kept in a constant temperature water tank at 45° C. for 8 hours. Then, it was transferred onto a 42-mesh sieve and vibrated with a powder tester manufactured by Hosokawa Micron Corporation at a vibration intensity of 5 for 10 seconds. The weight % of the toner remaining on the sieve was measured and determined in accordance with the below-described criteria to evaluate storage stability.

Weight % of Remaining Toner
⊙: 0% or more and less than 15%
○: 15% or more and less than 25%
Δ: 25% or more and less than 30%
x: More than 30%

[4] Evaluation of Mixing Properties

The above-mentioned method applies.

[Saturated Charge Amount, Charge Rising Properties, Charge Stability]

Into a 50 ml glass bottle were charged 0.5 g of a toner binder and 20 g of a ferrite carrier (F-150 manufactured by Powdertech Corporation). This was controlled to keep a relative humidity (R.H.) of 50% at 23° C. for 8 hours or more and then friction-stirred by using a Turbula shaker mixer at 50 rpm×1, 3, 5, 10, 20, and 60 minutes. The charge amount for each time period was measured. For the measurement, a blowoff charge measuring device [manufactured by Toshiba Chemical Corp.] was used. The charge amount resulting from friction for 10 minutes was defined as a saturated charge amount. The charge amount resulting from friction for 1 minute/the charge amount resulting from friction for 10 minutes was calculated and defined as charge rising properties. The charge amount resulting from friction for 60 minutes/the charge amount resulting from friction for 10 minutes was calculated and defined as charge stability.

[5] Evaluation Criteria of Saturated Charge Amount
⊙: The absolute value of the saturated charge amount is 25 μC/g or more
○: The absolute value of the saturated charge amount is 20 μC/g or more and less than 25 μC/g
Δ: The absolute value of the saturated charge amount is 15 μC/g or more and less than 20 μC/g
x: The absolute value of the saturated charge amount is less than 15 μC/g

[6] Evaluation Criteria of Charge Rising Properties
⊙: 0.7 or more
○: 0.6 or more and less than 0.7
Δ: 0.5 or more and less than 0.6
x: less than 0.5

[7] Evaluation Criteria of Charge Stability
⊙: 0.8 or more
⊖: 0.7 or more and less than 0.8
Δ: 0.6 or more and less than 0.7
x: less than 0.6

As described above, the toners of the present invention (Examples 1 to 23) using the toner binder of the present invention all provided significantly good results on, in particular, charging characteristics and blocking resistance, as compared with the comparative toners (Comparative Examples 1 to 4) using the comparative toner binder.

INDUSTRIAL APPLICABILITY

The toner of the present invention using the toner binder of the present invention is excellent in the range of fixing temperatures, storage stability, and the like, so that it is useful as a toner used for electrophotography, electrostatic recording, electrostatic printing, and the like.

The invention claimed is:

1. A toner binder containing a polyester resin (P) comprising one or more types of polyester resins obtained by polycondensation of a carboxylic acid component (x) and an alcohol component (y), wherein at least one type (P1) of (P) contains 50 to 95 mol % of an aliphatic diol (y1) having a carbon number of 2 to 4 in the alcohol component (y), and (P) satisfies expressions (1) and (2), $$11.5 \leq \text{SP value } [(\text{cal/cm}^3)^{1/2}] \text{ of } (P) \leq 13.0 \quad (1) \text{ and}$$

$$5.2 \leq \text{HLB value [by Oda method] of } (P) \leq 7.1 \quad (2),$$

wherein the polyester resin (P1) is one obtained by esterifying 5 mol % or more of the terminal hydroxyl groups with a monocarboxylic acid (x1), one obtained by esterifying 5 mol % or more of the terminal carboxyl groups with a monool, or one obtained by modifying 5 mol % or more of the terminal hydroxyl groups into vinyl groups, and wherein the polyester resin (P) further satisfies the following expression (3):

$$\text{Mn of }(p) \leq 3.3 \times \text{Tg of }(P) \times \text{the SP value of }(P) \qquad (3),$$

wherein Tg represents a glass transition temperature, and Mn represents a number average molecular weight.

2. The toner binder according to claim 1,
wherein the carboxylic acid component (x) is a monocarboxylic acid (x1) and a polycarboxylic acid (x2), and 80 to 100 mol % of the carboxylic acid component (x) is an aromatic carboxylic acid.

* * * * *